US008810839B2

(12) United States Patent
Kishida

(10) Patent No.: US 8,810,839 B2
(45) Date of Patent: Aug. 19, 2014

(54) INFORMATION PROCESSING APPARATUS FOR TRANSFERRING IMAGE DATA, SERVER APPARATUS FOR RECEIVING TRANSFERRED IMAGE DATA, AND CONTROL METHODS AND STORAGE MEDIA THEREFOR

(75) Inventor: Akira Kishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 13/481,294

(22) Filed: May 25, 2012

(65) Prior Publication Data

US 2012/0307277 A1  Dec. 6, 2012

(30) Foreign Application Priority Data

Jun. 1, 2011  (JP) ................................. 2011-123638

(51) Int. Cl.
*G06K 15/02*  (2006.01)

(52) U.S. Cl.
USPC ......... 358/1.15; 707/759; 707/760; 358/1.13; 358/1.14; 358/1.18

(58) Field of Classification Search
None
See application file for complete search history.

(56) References Cited

U.S. PATENT DOCUMENTS

| 5,995,722 | A | 11/1999 | Kishida | |
|---|---|---|---|---|
| 6,289,371 | B1 * | 9/2001 | Kumpf et al. | 709/203 |
| 2006/0044594 | A1 * | 3/2006 | Shirai | 358/1.14 |
| 2012/0194854 | A1 * | 8/2012 | Tang et al. | 358/1.15 |

FOREIGN PATENT DOCUMENTS

JP  2005-275681 A  10/2005

* cited by examiner

*Primary Examiner* — Houshang Safaipour
*Assistant Examiner* — Richa Mishra
(74) *Attorney, Agent, or Firm* — Fitzpatrick, Cella, Harper & Scinto

(57) ABSTRACT

An information processing apparatus that makes it easy for a user to input an image from an image input apparatus. The information processing apparatus executes a search script received from a server apparatus to thereby obtain identification information for identifying the image input apparatus, transfers the identification information to the server apparatus, and executes a scan script sent from the server apparatus in reply to the identification information to thereby display a scan setting screen. The information processing apparatus transmits to the server apparatus a scan setting message when scan settings are made on the screen, receives a scan job message transmitted from the server apparatus in reply to the scan setting message, gives a scan job command to the image input apparatus to cause the image input apparatus to execute scanning, and transfers image data received from the image input apparatus to the server apparatus.

11 Claims, 12 Drawing Sheets

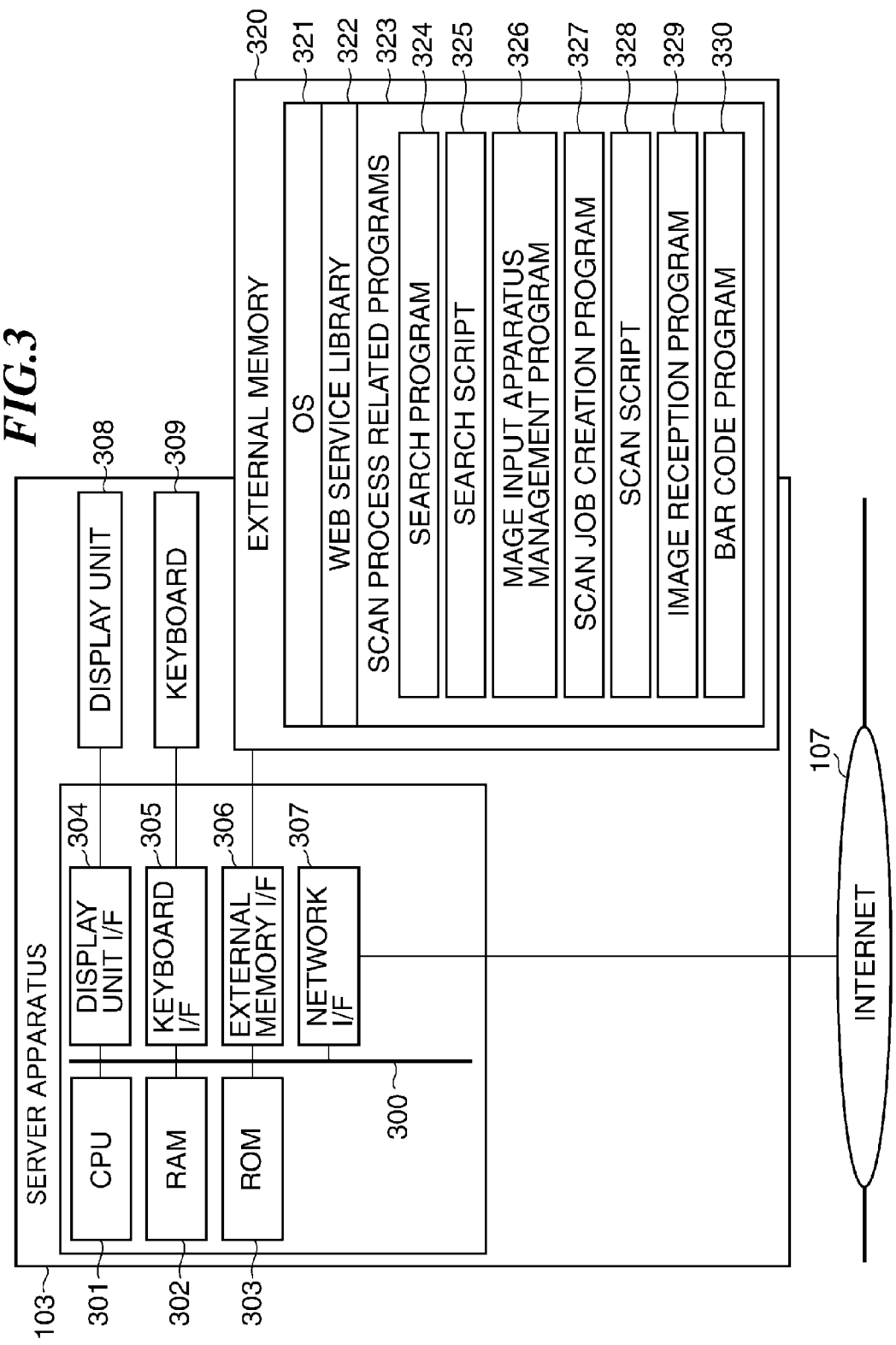

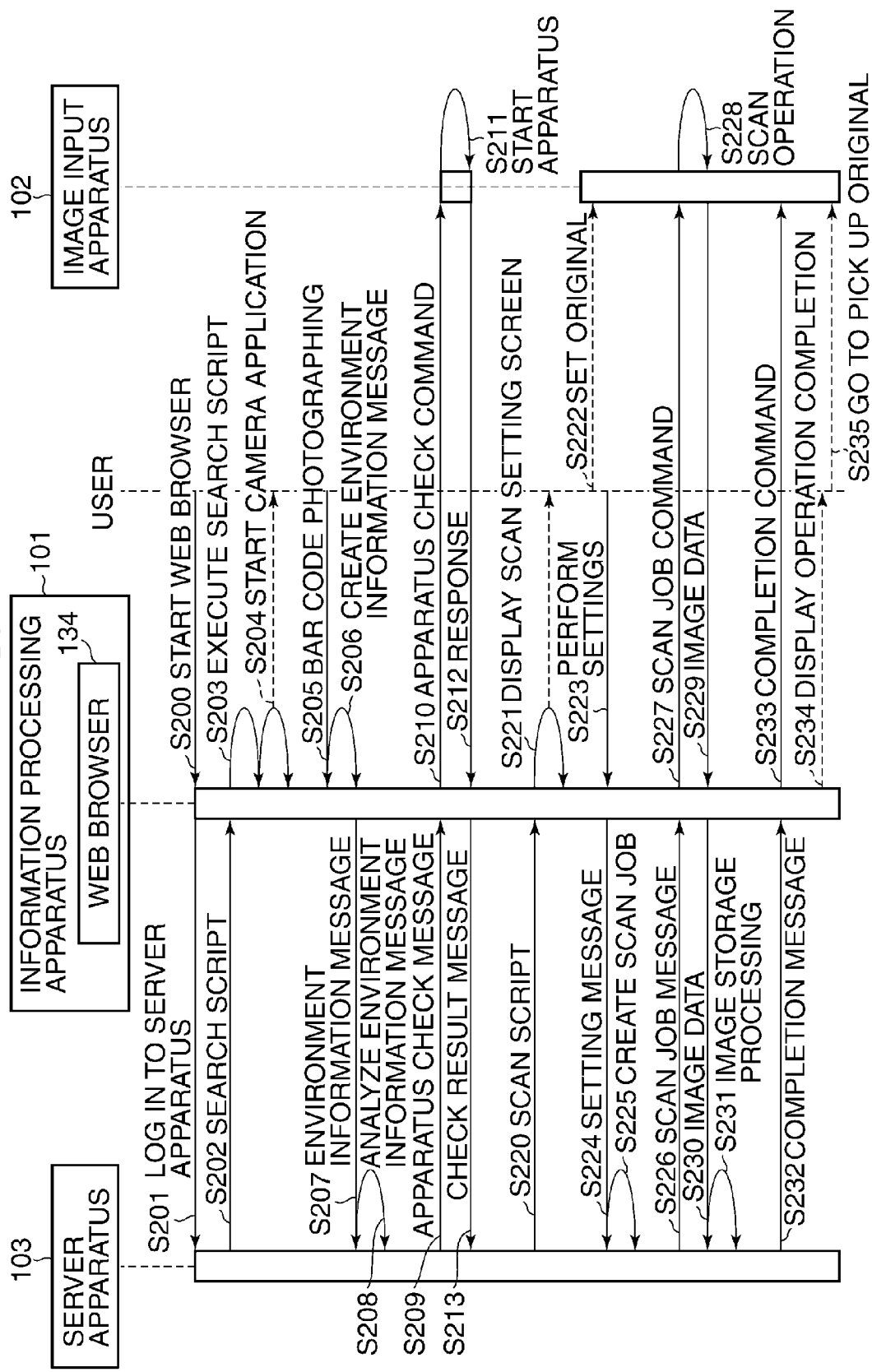

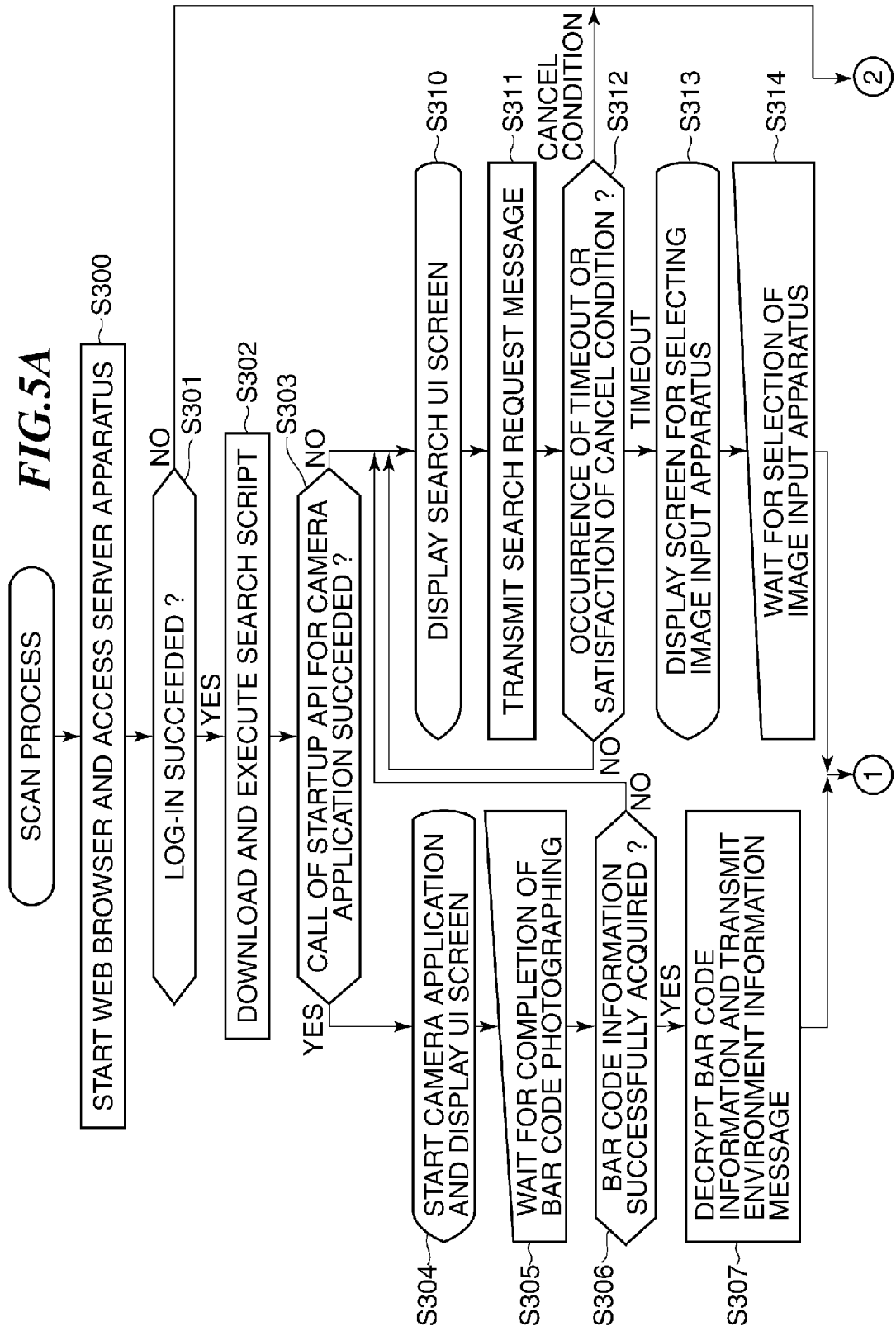

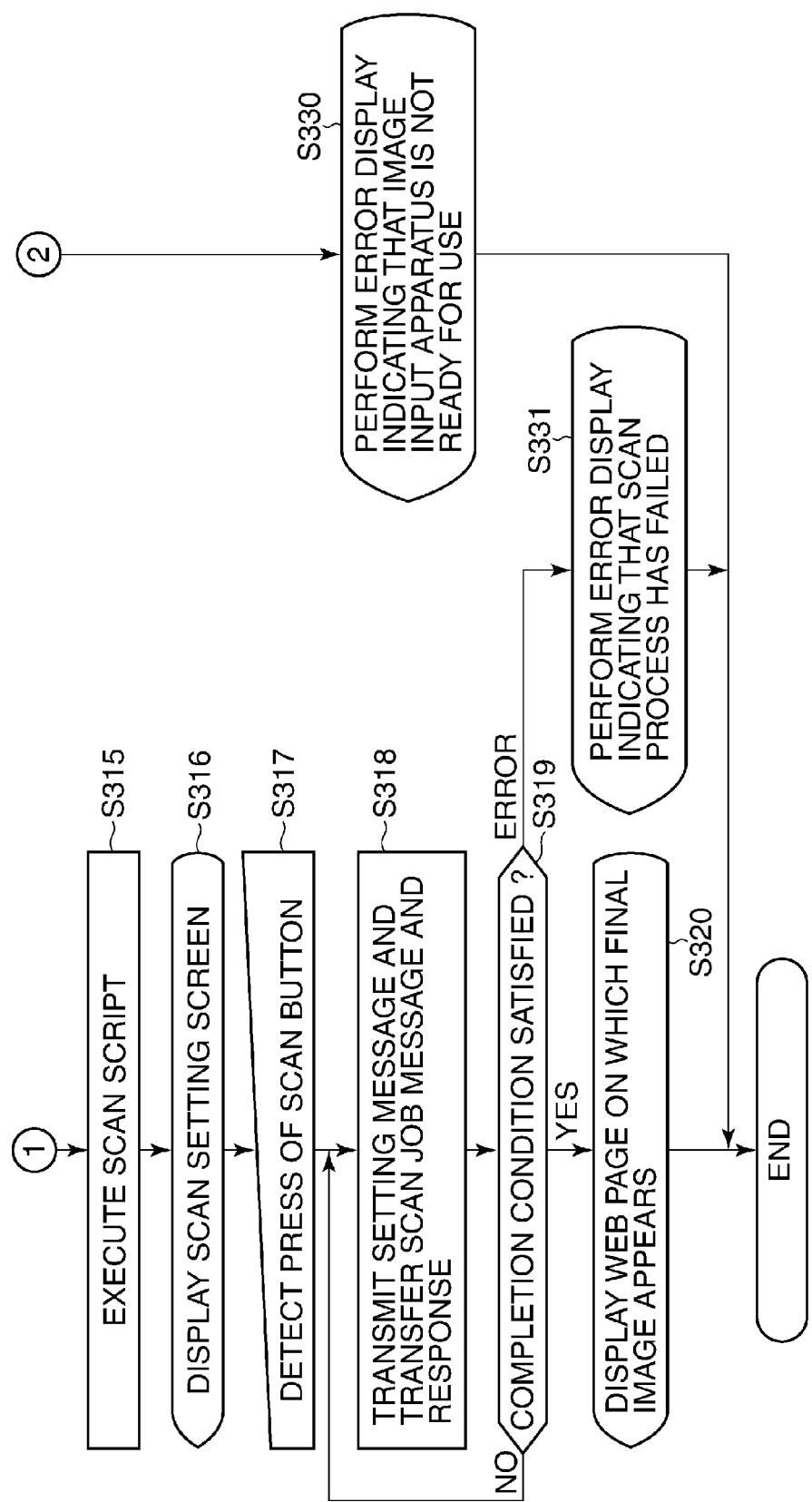

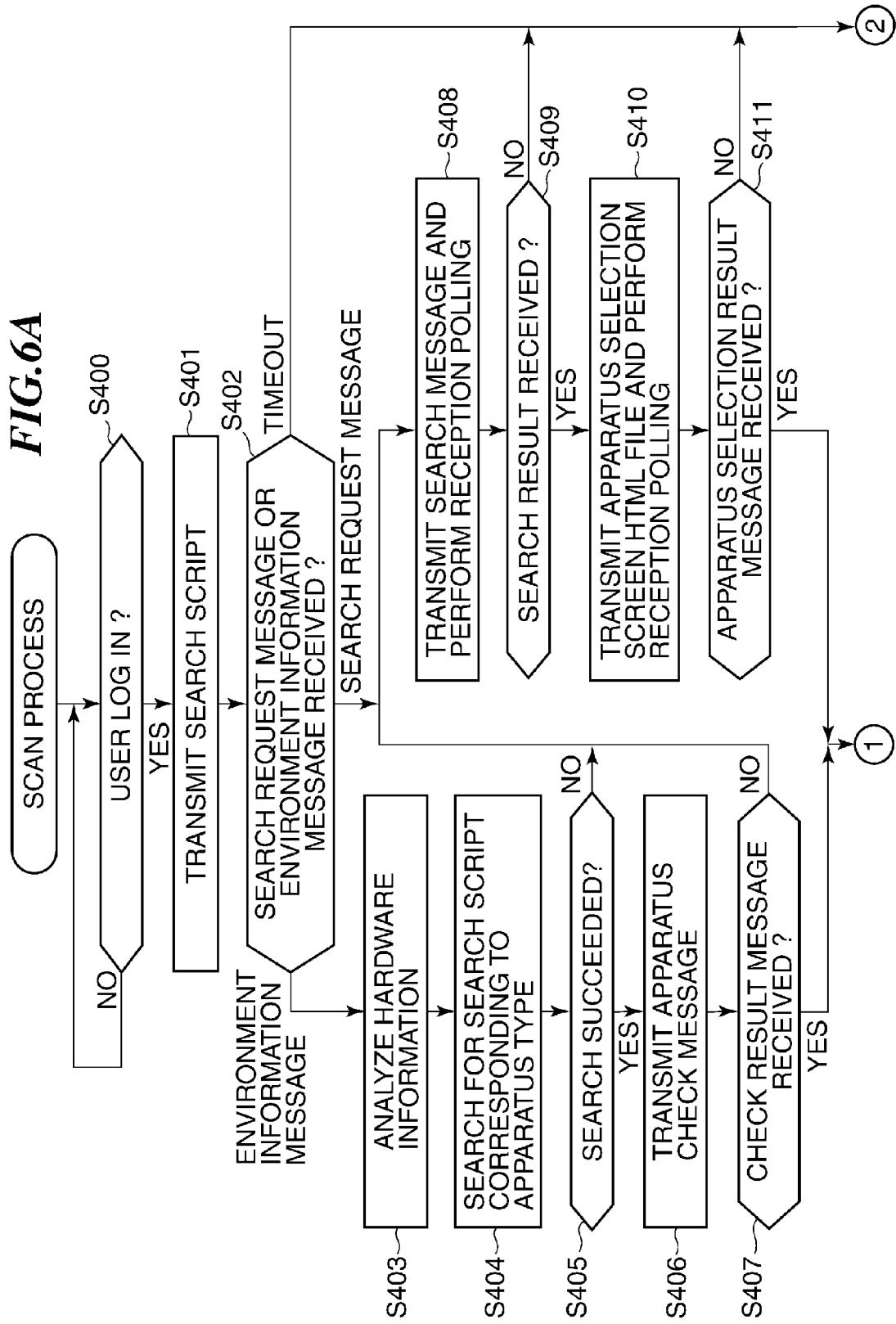

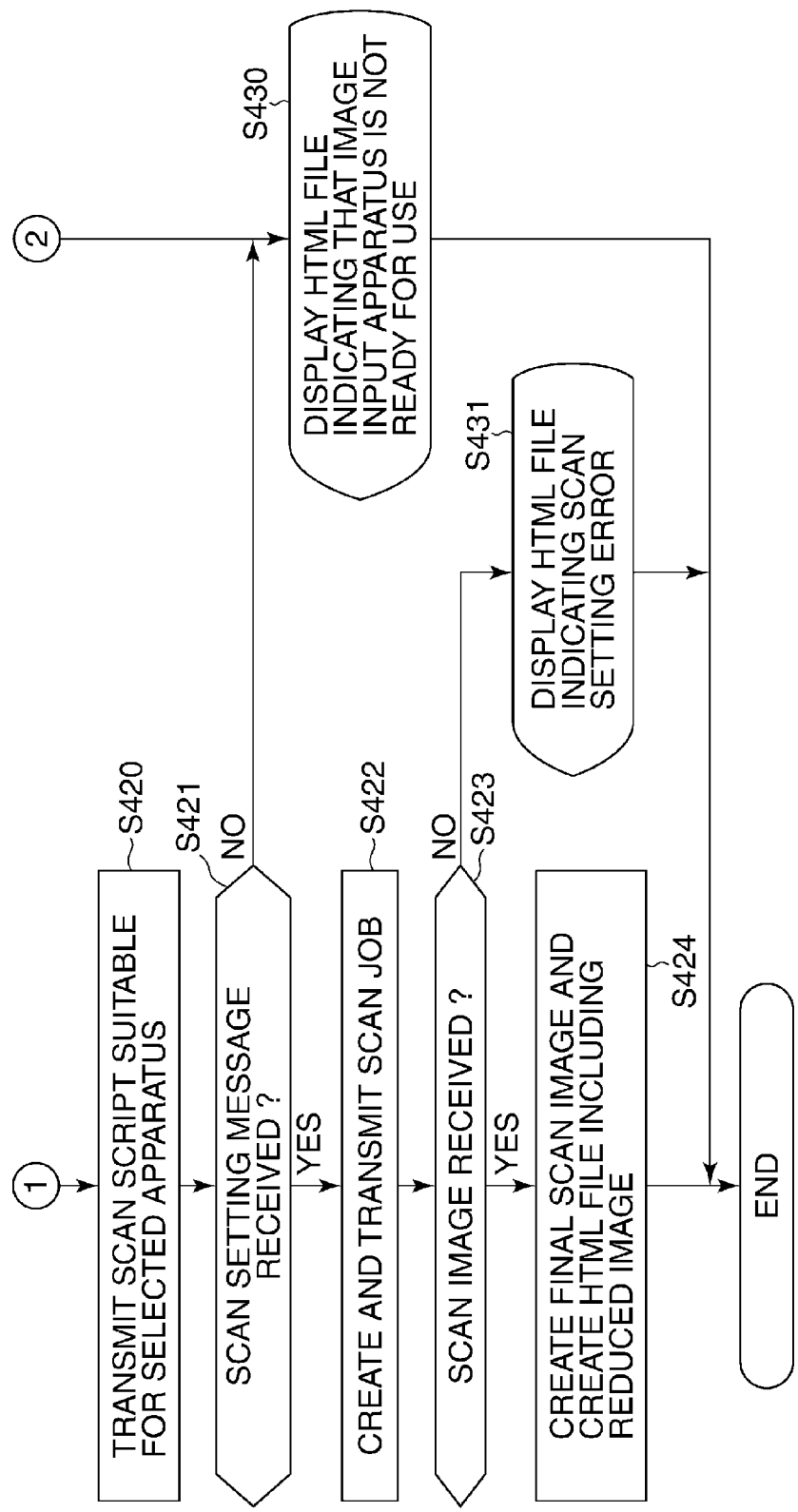

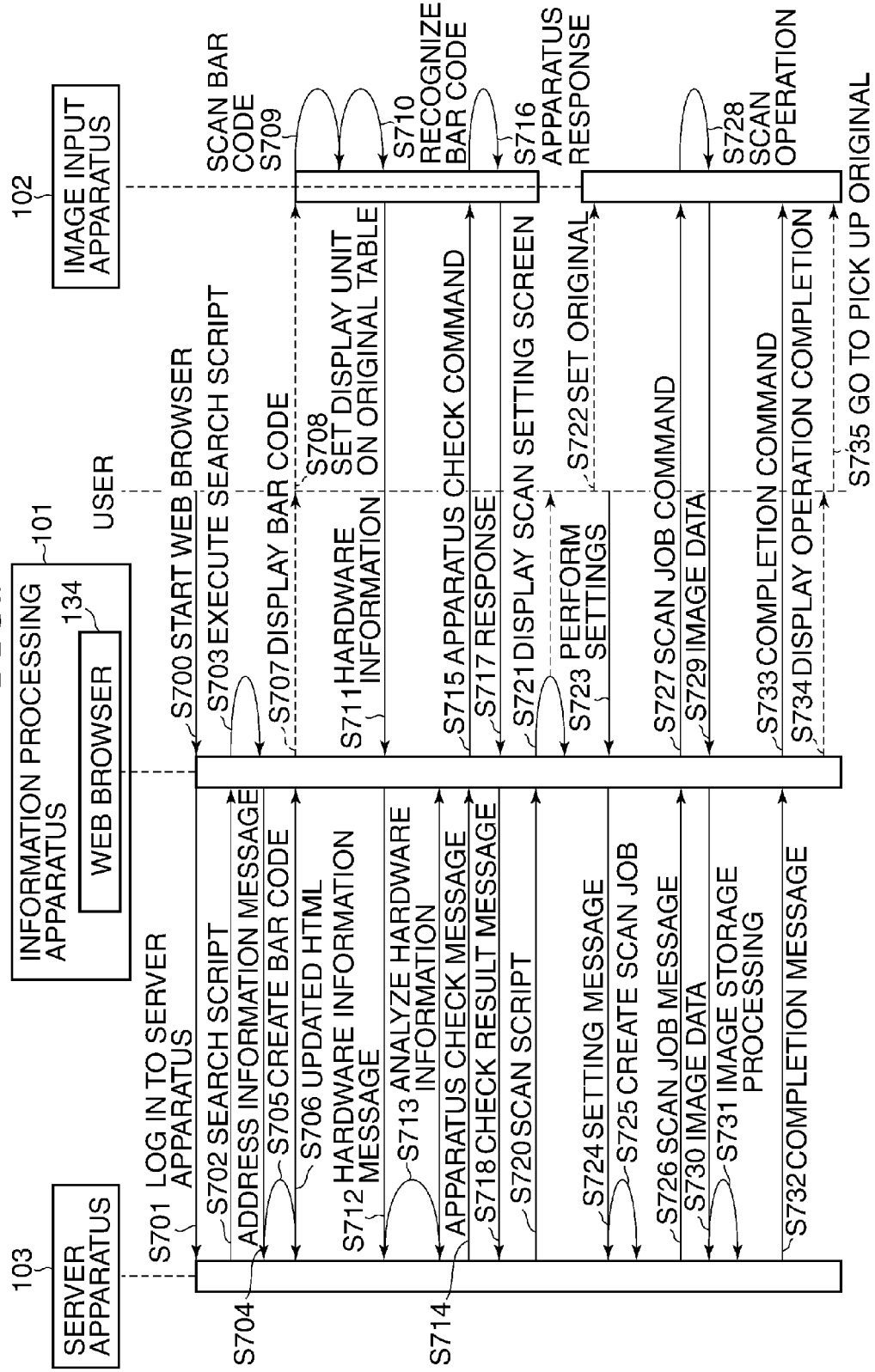

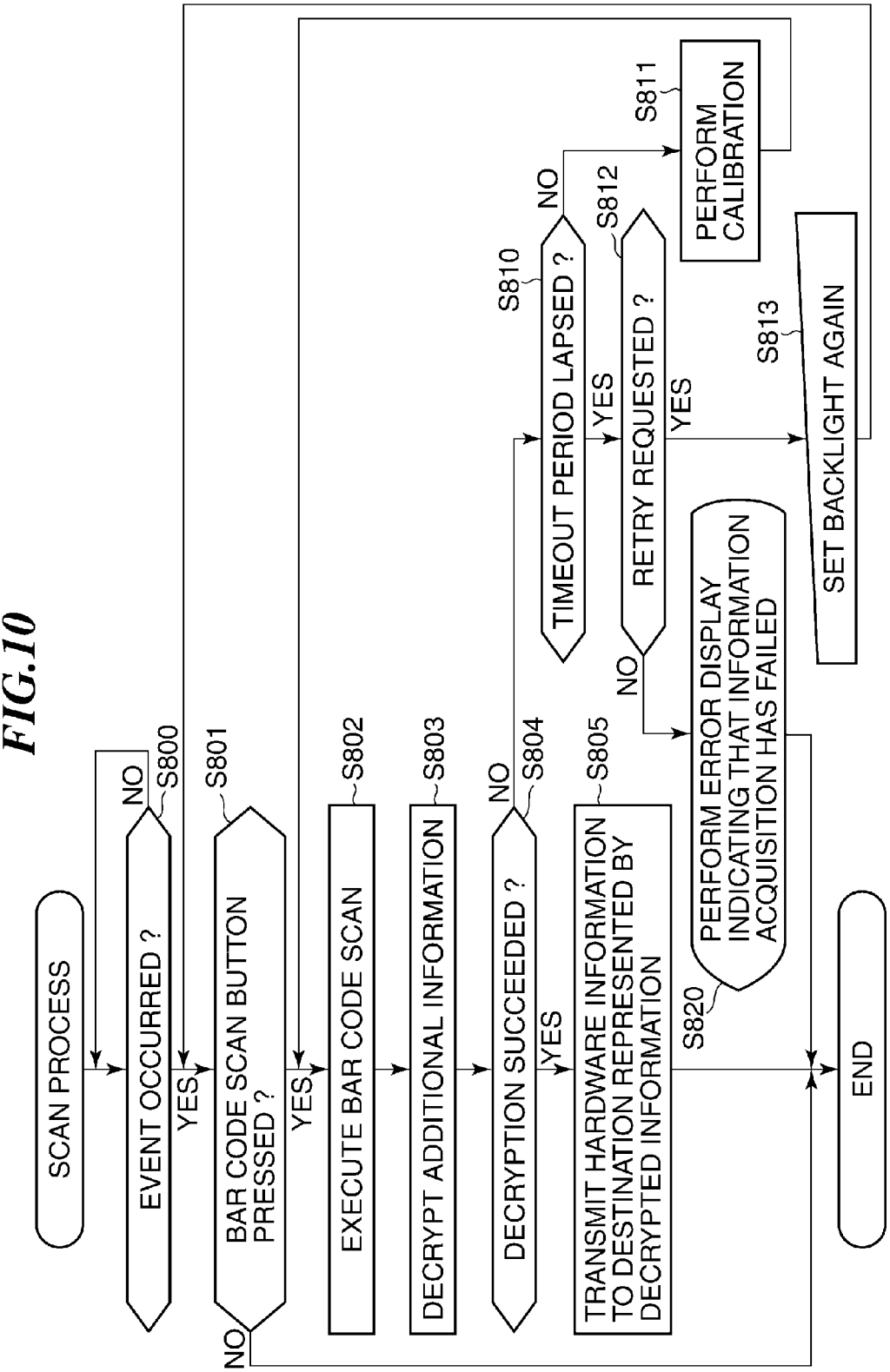

INFORMATION PROCESSING APPARATUS FOR TRANSFERRING IMAGE DATA, SERVER APPARATUS FOR RECEIVING TRANSFERRED IMAGE DATA, AND CONTROL METHODS AND STORAGE MEDIA THEREFOR

BACKGROUND OF THE INVENTION

1. Field of the Invention

The present invention relates to an information processing apparatus that transfers image data supplied from an image input apparatus, a server apparatus that receives image data transferred from the information processing apparatus, and control methods and storage media therefor.

2. Description of the Related Art

To enable an information processing apparatus to utilize a peripheral device, a device driver for the peripheral device must generally be installed to an operating system (OS) that operates on the information processing apparatus.

For example, in the case of enabling the information processing apparatus to utilize an image input apparatus (e.g., a scanner), a scanner driver is installed to the OS and started up from an application of the information processing apparatus, and scan settings are performed to make the image input apparatus usable, so that image data acquired by the image input apparatus is transferred to and processed by the information processing apparatus.

Conventionally, however, a scanner driver that corresponds to the image input apparatus and to the OS operating on the information processing apparatus must be made ready for use. To this end, a user looks for a proper scanner driver that corresponds to a combination of the OS and the image input apparatus and installs the scanner driver to the OS. This is cumbersome. In addition, a manufacturer and seller of the image input apparatus is requested to supply various scanner drivers respectively corresponding to various types of OS.

In, e.g., Japanese Laid-open Patent Publication No. 2005-275681, there is disclosed an information processing method that makes it easy to select a transmission destination address and to prevent an erroneous selection at data exchange between image input terminals via a network. With this method, an image read by a scanner of an image input terminal is transmitted to a desired image input terminal (e.g., an Internet server apparatus) based on address information represented by a bar code or a QR (quick response) code (registered trademark), which is embedded in the image. In other words, functions of reading and transmitting image data are realized by a scanner driver.

Furthermore, there is a network system called cloud computing. With the cloud computing, image processing can be carried out by a web service application provided by a server apparatus on the Internet, making it possible to utilize image data in a wide range of fields.

With the cloud computing, image data is sometimes transferred to a server apparatus on the Internet. In that case, an image file (image data) selected on, e.g., an image upload menu in a web page opened in a web browser application is transferred by a file transfer application from an information processing apparatus to a desired server apparatus.

To use image data added with, e.g., bar code information or two-dimensional QR code information as in the information processing method disclosed in Japanese Laid-open Patent Publication No. 2005-275681, the image input apparatus must have a function of decrypting the bar code or QR code information. Also, the bar code or QR code information must be added in advance to an original to be read.

Furthermore, it is difficult for a user to judge whether or not the information processing apparatus can be used in combination with the image input apparatus. In a case, for example, that the information processing apparatus is camera compatible and Wi-Fi compatible and the image input apparatus is a scanner apparatus, it is difficult to judge whether the information processing apparatus is capable of accessing the scanner apparatus and judge whether the scanner apparatus has an image transmission function. This makes it not easy for the user to configure an image input system environment capable of computerizing documents with ease.

SUMMARY OF THE INVENTION

The present invention provides an information processing apparatus that makes it easy for a user to input an image from an image input apparatus, a server apparatus capable of communicating with the information processing apparatus, and control methods and storage media therefor.

According to one aspect of this invention, there is provided an image input apparatus capable of communicating with an image input apparatus and with a server apparatus, which comprises a first transfer unit configured to receive a search script from the server apparatus, execute the received search script to thereby obtain identification information that identifies the image input apparatus, and transfer the identification information to the server apparatus, a second transfer unit configured to receive from the server apparatus a scan script that corresponds to the image input apparatus, execute the received scan script to thereby display a setting screen, transmit to the server apparatus a setting message that represents settings which have been set on the setting screen and according to which an original will be scanned by the image input apparatus, and supply the image input apparatus with a job command that corresponds to a job message transmitted from the server apparatus in reply to the setting message, and a third transfer unit configured to receive image data obtained by scanning performed by the image input apparatus in accordance with the scan job command and transfer the received image data to the server apparatus.

With this invention, a user is capable of inputting an image from an image input apparatus with ease.

Further features of the present invention will become apparent from the following description of exemplary embodiments with reference to the attached drawings.

BRIEF DESCRIPTION OF THE DRAWINGS

FIG. 3 is a block diagram showing the construction of the server apparatus;

FIG. 4 is a sequence diagram showing a scan process performed by the image input system;

FIGS. 5A and 5B are a flowchart showing an example of a scan process performed by the information processing apparatus;

FIGS. 6A and 6B are a flowchart showing an example of a scan process performed by the server apparatus;

FIG. 9 is a sequence diagram showing a scan process performed by an image input system according to a second embodiment of this invention; and FIG. 10 is a flowchart showing an example of a scan process performed by an image input apparatus of the image input system shown in FIG. 9.

DESCRIPTION OF THE EMBODIMENTS

The present invention will now be described in detail below with reference to the drawings showing preferred embodiments thereof.

First Embodiment

Figure 1:
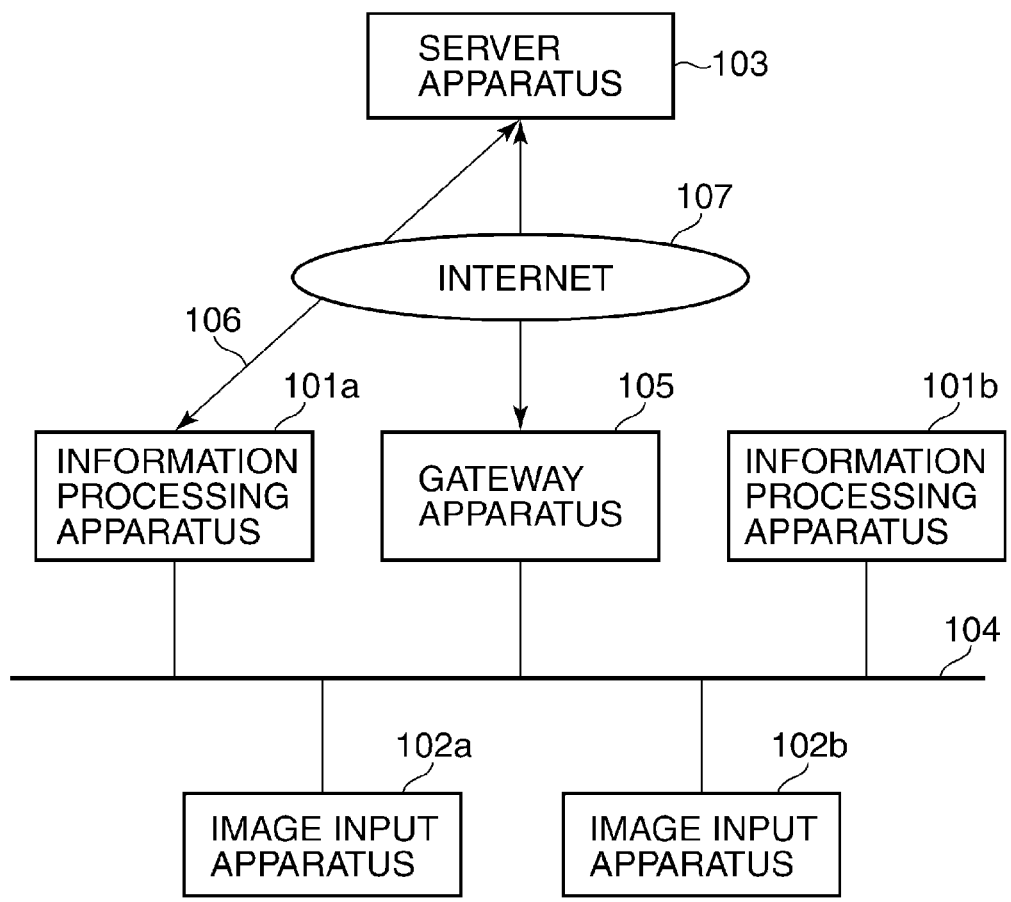
FIG. 1 is a block diagram schematically showing the construction of an image input system that includes information processing apparatuses and a server apparatus according to a first embodiment of this invention.

FIG. 1 schematically shows, in block diagram, the construction of an image input system that includes information processing apparatuses and a server apparatus according to a first embodiment of this invention.

Referring to FIG. 1, the image input system shown therein includes a server apparatus 103 connected via a network (e.g., the Internet 107) with an information processing system that includes information processing apparatuses 101a, 101b, image input apparatuses 102a, 102b, and a gateway apparatus 105. Each of the image input apparatuses 102a, 102b has, for example, functions of scanning an original to generate image data and transmitting the generated image data. Each of the information processing apparatuses 101a, 101b is, for example, a portable information processing apparatus (information processing terminal) such as a cellular phone.

The information processing apparatuses 101a, 101b and the image input apparatuses 102a, 102b are connected to one another through a local network 104 (e.g., wireless circuit) such as Ethernet (registered trademark).

The information processing apparatus 101a is connected to the server apparatus 103 through a data communication network 106 (such as a mobile phone communication network) and the Internet 107, for example. The information processing apparatus 101b is connected to the Internet 107 through the gateway apparatus 105.

The information processing apparatuses 101a, 101b are capable of communicating with the image input apparatuses 102a, 102b and capable of communicating with the server apparatus 103. The server apparatus 103 is capable of communicating with the information processing apparatuses 101a, 101b.

Figure 2:
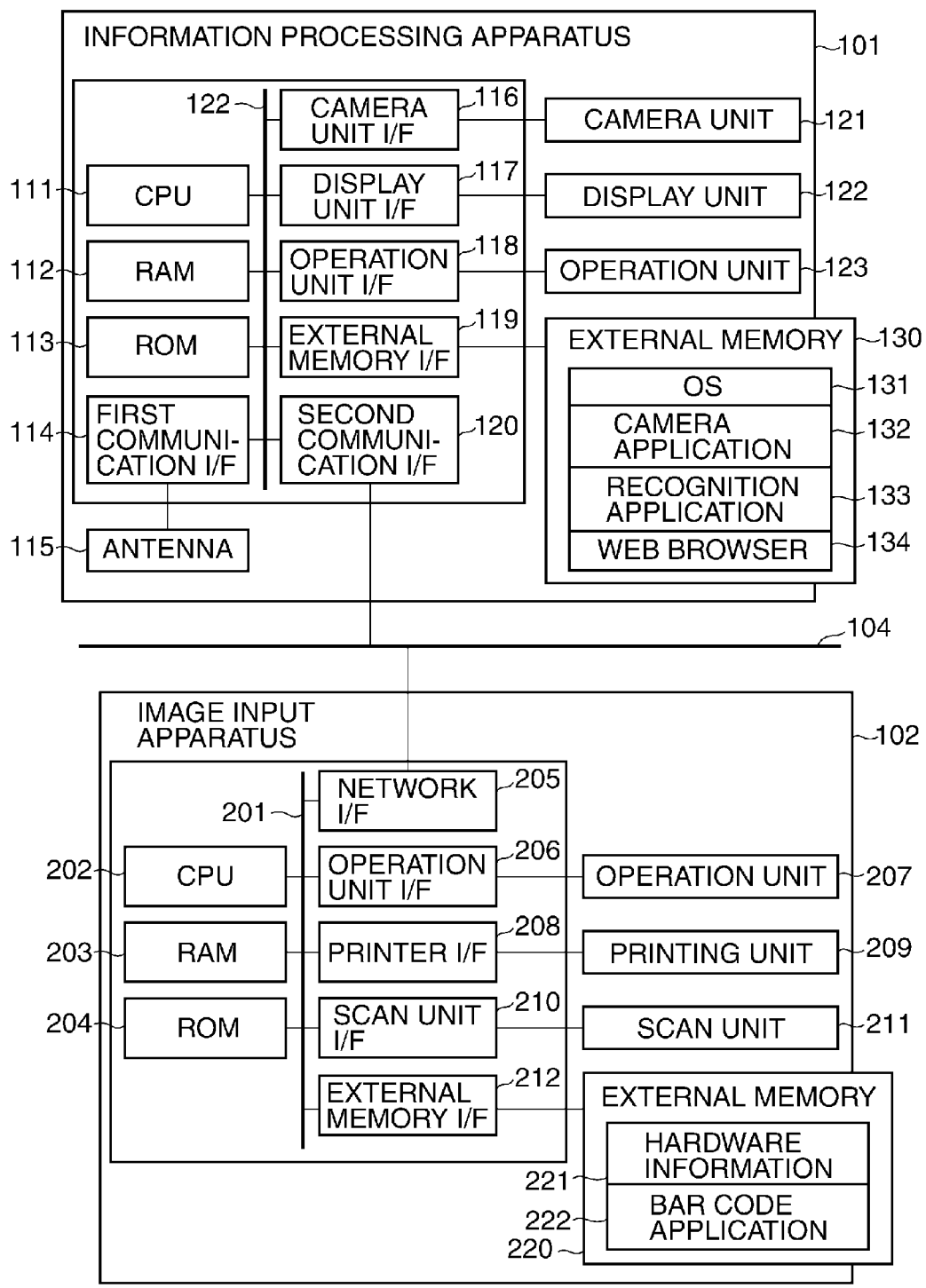
FIG. 2 is a block diagram showing the constructions of the information processing apparatuses and image input apparatuses.

FIG. 2 shows, in block diagram, the constructions of the information processing apparatuses 101a, 101b and the image input apparatuses 102a, 102b. The information processing apparatuses 101a, 101b are the same in construction as each other and denoted in FIG. 2 by reference numeral 101 without distinction therebetween. Similarly, the image input apparatuses 102a, 102b are the same in construction as each other and denoted in FIG. 2 by reference numeral 102 without distinction therebetween.

As shown in FIG. 2, the information processing apparatus 101 includes a CPU 111 that overall controls devices connected to a system bus 122 based on a program loaded into a RAM 112. The RAM 112 is used by the CPU 111 as a main memory, a work area, etc. In a ROM 113, various programs and data are stored.

A camera unit interface (I/F) 116 controls a camera unit 121 to input a photographed image from the camera unit 121. A display unit I/F 117 controls image display on a display unit 122. An operation unit I/F 118 controls input from an operation unit 123 and from a pointing device (e.g., touch panel, not shown).

An external memory I/F 119 controls access to an external memory 130 such as a flash memory or a solid state disk (SSD). In the external memory 130, an operating system (hereinafter referred to as the OS) 131, camera application 132, recognition application 133, and web browser 134 are stored.

A first communication I/F 114 is a control unit for communication with the data communication network 106 (e.g., mobile communication network) shown in FIG. 1, and establishes network connection with a wireless base station via an antenna 115. A second communication I/F 120 is a control unit for, e.g., a Wi-Fi wireless network and for a preferred network, and is connected to the local network 104 via a Wi-Fi antenna (not shown).

A script file operating on the web browser 134 is not initially stored in the external memory 130 of the information processing apparatus 101 when the information processing apparatus 101 is newly used by a user. In the illustrated example, in a case where a script for configuring the image input system is not stored in the external memory 130, the web browser 134 operating on the OS 131 downloads a script from the server apparatus 103 and stores it into the RAM 112. Script execution processing performed by the web browser 134 will be described later.

The image input apparatus 102 includes a CPU 202 that controls the image input apparatus 102. Reference numeral 201 denotes a system bus. A RAM 203 is used by the CPU 202 as a main memory, a work area, etc. and also used as an input information developing area and an environment data storage area. The RAM 203 is further provided with a NVRAM (nonvolatile RAM) area. The memory capacity of the RAM 203 can be expanded by connecting an option RAM to an expansion port (not shown).

In a ROM 204, various fonts, control programs executed by the CPU 202, various data, etc. are stored. A network I/F 205 transmits and receives data to and from the information processing apparatus 101. A printer I/F 208 provides an interface with a printing unit 209, which is a printer engine. A scan unit I/F 210 provides an interface with a scan unit 211, which is a scanner engine.

An operation unit I/F 206 provides an interface with an operation unit 207 used to make scan settings for the image input apparatus 102. The operation unit 207 is provided with an operation panel for accepting a user's operation. The operation panel has operation switches, LED display device, etc. It should be noted that the operation unit 207 can be provided with a NVRAM (not shown) for storing scan setting information input via the operation panel. An external memory I/F 212 controls access to an external memory 220.

The external memory 220 is implemented by, e.g., a flash memory-based SSD and capable of storing hardware information 221 (device identification information, more generally, identification information) and a bar code application 222. It should be noted that in a case where the external memory 220 is not connected to the image input apparatus 102, the information processing apparatus 101 uses hardware information and bar code application, which are stored in the ROM 204.

When an image embedded with additional information (code information) obtained by encoding network address information is scanned, the bar code application 222 decrypts the additional information to acquire the network address information. Further, the bar code application 222 encodes the network address information and information about device name, etc., and displays these pieces of coded information on the LED display device of the operation unit 207.

In accordance with a control program stored in the ROM 204, the CPU 202 acquires image data from the scan unit 211 via the scan unit I/F 210. The CPU 202 communicates with the information processing apparatus 101 via the network I/F 205. For example, the CPU 102 controls to transmit image data to the information processing apparatus 101 and controls to notify various information stored in the image input apparatus 102 to the information processing apparatus 101.

In the illustrated example, the network I/F 205 is mounted with a web service protocol and a scan protocol.

FIG. 3 shows the construction of the server apparatus 103 in block diagram.

As shown in FIG. 3, the server apparatus 103 includes a CPU 301 that overall controls devices connected to a system bus 300 in accordance with a program loaded into a RAM 302. The RAM 302 is used by the CPU 301 as a main memory, a work area, etc. In a ROM 303, various programs and data are stored. A keyboard I/F 305 controls input from a keyboard 309 and from a pointing device (e.g., mouse, not shown). A display unit I/F 304 controls image display on a display unit 308.

An external memory I/F 306 controls access to an external memory 320 such as a hard disk (HD) or an SSD. In the external memory 320, an OS 321, web service library 322, various scan process related programs 323, user files (not shown), edit files (not shown), etc. are stored.

The scan process related programs 323 include a search program 324, search script 325, image input apparatus management program 326, scan job creation program 327, scan script 328, image reception program 329, and bar code program 330.

A network I/F 307 is connected to the information processing apparatus 101 via the Internet 107 or via the wireless communication network 106, and communicates with the image input apparatus 102 via the information processing apparatus 101.

FIG. 4 shows in sequence diagram a scan process performed by the image input system shown in FIG. 1.

As previously described, the information processing apparatus 101 is capable of accessing the image input apparatus 102 via the local network 104. The image input apparatus 102 is capable of displaying bar code information on the operation unit 207, or a bar code is affixed to the operation unit 207. Thus, a user easily becomes aware of the presence of the bar code and is capable of taking a photograph of the bar code information or of the bar code by using the information processing apparatus 101 (e.g., a cellular phone with camera).

When the web browser 134 is loaded into the RAM 112, the information processing apparatus 101 becomes capable of accessing the server apparatus 103.

In the scan process of FIG. 4, the user who wishes to use a scan service starts the web browser 134 by using the operation unit 120 of the information processing apparatus 101 (step S200). The information processing apparatus 101 accesses and logs in to the URL of the server apparatus 103 (step S201).

If the log-in is succeeded, the server apparatus 103 downloads the search script 325 to the web browser 134 (step S202). The downloaded search script 325 is executed on the web browser 134 (step S203), and an application program interface (API) for startup of the camera application 132 is called.

It should be noted that the camera application 132 can be started also from the web browser 134. More specifically, the search script 325 running on the web browser 134 can call the camera application 132.

If the search script 325 has successfully called the API for the camera application 132, the camera application 132 is started (step S204). Next, the user performs bar code photographing by using the information processing apparatus 101. More specifically, the user takes a photograph of the bar code affixed to the image input apparatus 102 or of bar code information displayed on the operation unit 207 by using the camera application 132 of the apparatus 101 (step S205).

The camera application 132 starts the recognition application 133 and sends image data obtained by the bar code photographing to the recognition application 133. When recognizing that the image data represents a bar code, the recognition application 133 sends a response value (i.e., character information that represents a recognition result) to the search script 325 that has called the camera application 132. The search script 325 adds, e.g., information that represents a network address of the information processing apparatus 101 on the local network 104 to the received character information, thereby creating an environment information message (step S206), and transmits the environment information message to the server apparatus 103 (step S207).

The server apparatus 103 analyzes the environment information message by using the image input apparatus management program 326 (step S208). It should be noted that the environment information message includes information representing an apparatus type of image input apparatus 102 and includes information about the network address and/or URL for identifying the image input apparatus 102 on the local network 104.

The search program 324 of the server apparatus 103 transmits to the information processing apparatus 101 an apparatus check message in an attempt to try to determine whether a search script can be used that is obtained based on a result of the analysis of the environment information message (step S209). When receiving the apparatus check message, the search script 325 in the information processing apparatus 101 transmits to the image input apparatus 102 an apparatus check command by using a transfer technique such as processing for conversion of IP header of packet data (step S210). Packet data conversion processing performed by the search script 325 will be described later.

When receiving the apparatus check command, the image input apparatus 102 is started (step S211). The image input apparatus 102 determines whether or not the apparatus 102 is an apparatus that corresponds to the search script associated with the apparatus check command. If the image input apparatus 102 is an apparatus corresponding to the search script associated with the apparatus check command, the image input apparatus 102 transmits a response to the information processing apparatus 101 from which the apparatus check command has been transmitted (step S212).

When receiving the response, the search script 325 operating on the web browser 134 in the information processing apparatus 101 converts the response received from the image input apparatus 102 into a check result message, and transfers the check result message to the server apparatus 103 (step S213). Response conversion processing performed by the search script will be described later.

Next, the image input apparatus management program 326 selects a scan script suitable for the image input apparatus 102 corresponding to the check result message. Then, the selected scan script (hereinafter denoted by reference numeral 328) is downloaded from the server apparatus 103 to the web browser 134 (step S220). The downloaded scan script 328 is executed by the web browser 134, and a scan setting screen is displayed on the display unit 122 (step S221). In response to the scan setting screen being displayed, the user sets an original to the image input apparatus 102 (step S222), and performs scan settings on the scan setting screen (step S223).

Although not illustrated, the information processing apparatus 101 periodically transmits a message related to HTML file update to the server apparatus 103 in order to periodically confirm the status of the server apparatus 103, while the scan script 328 is being executed. When the status of the server apparatus 103 changes, HTML file update is performed.

The scan script 328 transmits to the server apparatus 103 a setting message representing the scan settings set by the user (step S224). Based on the scan settings represented by the setting message, the scan job creation program 327 in the server apparatus 103 creates a scan job (step S225). Then, the server apparatus 103 transmits to the information processing apparatus 101 a scan job message that requests execution of the scan job (step S226).

Upon receipt of the scan job message, the scan script 328 in the information processing apparatus 101 transmits to the image input apparatus 102 a scan job command corresponding to the scan job message (step S227). In accordance with the scan job command, the image input apparatus 102 executes a scan operation (step S228).

The image input apparatus 102 transmits image data obtained by the scan operation to the information processing apparatus 101 (step S229). The scan scrip 328 in the information processing apparatus 101 transmits the image data as it is to the server apparatus 103 by using a transfer technique such as processing for conversion of IP header of packet data (step S230). Since the server apparatus 103 already identifies the image input apparatus 102 as previously described, the server apparatus 103 is capable of executing image conversion processing proper to a type of the image data by using the image reception program 329. Then, image processing and image storage processing are executed by the image reception program 329 in the server apparatus 103 (step S231).

Upon completion of the image storage processing, the HTML file is updated in the server apparatus 103, and a completion message is transmitted from the server apparatus 103 to the information processing apparatus 101 (step S232). The scan script 328 converts the completion message into a completion command and transmits the completion command to the image input apparatus 102 (step S233). In response to the completion message, the web browser 134 displays an operation completion display screen (step S234), thereby prompting the user to go to the image input apparatus 102 to pick up the original whose scan has been finished (step S235).

With the scan process of FIG. 4, the image data obtained by scanning the original by the image input apparatus 102 is received by the information processing apparatus 101 and then transferred to the server apparatus 103 from the information processing apparatus 101.

FIGS. 5A and 5B show, in flowchart, an example of a scan process performed by the information processing apparatus 101.

At start of the scan process of FIGS. 5A and 5B, the web browser 134 is started by the OS 131 of the information processing apparatus 101. The browser 134 accesses the URL of the server apparatus 103 and logs in a web page hosted by the web service library 322 of the server apparatus 103 (step S300), and determines whether or not the log-in is succeeded (step S301).

If the log-in is succeeded (i.e., if YES to step S301), the web browser 134 downloads the search script 325 from the server apparatus 103 via the Internet 107 and executes the search script 325 (step S302). The search script 325 calls the startup API for the camera application 132 and determines whether or not the call is succeeded (step S303).

If the call of the startup API for the camera application 132 is succeeded (i.e., if YES to step S303), the camera application 132 is started by the web browser 134 and displays a user interface (UI) screen (step S304).

The user takes a photograph of the bar code affixed to the image input apparatus 102 or of the bar code information displayed on the operation unit 207 by using the information processing apparatus 101, more specifically, by using the UI screen thereof on which the bar code or the bar code information appears. The camera application 132 waits for completion of the bar code photographing (step S305), and checks whether photographed image data is recognizable image data (such as bar code), thereby determining whether bar code information is successfully acquired (step S306).

If bar code information is successfully acquired (i.e., if YES to step S306), the camera application 132 starts the recognition application 133 that decrypts the bar code information and sends a response value (i.e., character information representing a decryption result) to the search script 325 that has called the startup API. The search script 325 creates an environment information message that includes the character information added with, e.g., information representing the network address of the information processing apparatus 101 on the local network 104, and transmits the environment information message to the server apparatus 103 (step S307), whereupon the process proceeds to step S315.

If the call of the startup API has failed (i.e., if NO to step S303), the search script 325 displays a search UI screen (step S310). As a result, even if the image input apparatus cannot be selected based on the bar code encrypted in steps S304 to S307, it becomes possible to select a desired image input apparatus as described later. Next, the search script 325 transmits a search request message to the server apparatus 103 (step S311).

When receiving a search network message (network packet) which is sent back from the server apparatus 103 as a response to the search request message, the search script 325 converts the IP header of the network packet and broadcasts the packet after header conversion to the local network 104.

When a response packet is sent back from the image input apparatus 102a or 102b in reply to the broadcasted network packet, the search script 325 converts the IP header of the response packet and transfers to the server apparatus 103 the packet after header conversion as a response message.

Next, the search script 325 determines whether a timeout occurs in polling processing in which the server apparatus 103 accepts a response for a predetermined period of time, and also determines whether a predetermined cancel condition is satisfied (step S312). If no timeout occurs in the polling processing and if the cancel condition is not satisfied (i.e., if NO to step S312), the process returns to step S310.

If the cancel condition is satisfied (a "cancel condition" branch in step S312), the web browser 134 displays an HTML file that represents an error and that includes, e.g., a statement "Image input apparatus is not ready for use" (step S330). Whereupon, the scan process is completed.

If a timeout occurs in the polling processing (a "timeout" branch in step S312), the HTML file is updated from the server apparatus 103, and the web browser 134 displays a UI screen for selecting an image input apparatus (step S313), thereby prompting the user to select the desired image input apparatus from a list of image input apparatuses displayed on the UI screen. The web browser 134 waits for selection of the desired image input apparatus (step S314).

If the photographed image data is other than recognized image data such as a bar code (i.e., if NO to step S306), the process proceeds to step S310 described above. If the web browser 134 has failed to log in the web page (i.e., if NO to step S301), the process proceeds to step S330 described above.

If the desired image input apparatus is selected on the UI screen in step S314, the web browser 134 notifies the server apparatus 103 of a selection result message that represents the selected image input apparatus (hereinafter denoted by reference numeral 102).

The server apparatus 103 transmits to the information processing apparatus 101 a scan script 328 corresponding to the selected image input apparatus 102. The web browser 134 executes the scan script 328 (step S315), whereby a UI screen for making scan settings is displayed in the information processing apparatus 101 (step S316), thereby prompting the user to make scan settings and to press a scan button to start scan.

When detecting a press of the scan button (step S317), the scan script 328 transmits to the server apparatus 103 a scan setting message that represents the scan settings performed on the information processing apparatus 101. When a scan job message is transmitted from the server apparatus 103 in reply to the scan setting message, the scan script 328 transfers the scan job message to the selected image input apparatus 102 through the local network 104. Furthermore, the scan script 328 transfers to the server apparatus 103 a response sent back from the image input apparatus 102 and including scan image data (step S318).

Next, the server apparatus 103 determines whether the image storage processing is completed and also determines whether a timeout period for receiving scan image data has lapsed, thereby determining whether the completion condition is satisfied (step S319).

If the completion condition is not satisfied (i.e., if NO to step S319), the process returns to step S318. If an error such as cancellation occurs (an "error" branch in step S319), the web browser 134 receives from the server apparatus 103 an HTML file representing an error and including, e.g., a statement "Scan process has failed" and displays the received HTML file (step S331), whereupon the scan process is completed.

On the other hand, if the completion condition is satisfied (i.e., if YES to step S319), the web browser 134 displays on the UI screen a notification of status after scan that represents that scan image data has normally been stored into the server apparatus 103. More specifically, the web browser 134 shifts to and displays a web page on which a final image appears (step S320), whereupon the scan process is completed.

FIGS. 6A and 6B show, in flowchart, an example of a scan process performed by the server apparatus 103.

At start of the scan process of FIGS. 6A and 6B, the server apparatus 103 determines, based on a request message transmitted from the information processing apparatus 101, whether there is a user log in (step S400). If there is no user log in (i.e., if NO to step S400), the process returns to step S400 where the server apparatus 103 waits for user log in. On the other hand, when there is a user log in (i.e., if YES to step S400), the search program 324 downloads or transmits the search script 325 to the information processing apparatus 101 (step S401).

Next, the server apparatus 103 determines whether it receives a search request message or an environment information message from the information processing apparatus 101 within a predetermined timeout period (step S402).

If the timeout period has lapsed without receiving the search request message or the environment information message (a "timeout" branch in step S402), the image input management program 326 creates an HTML file including a message such as "Image input apparatus is not ready for use" and transmits the created HTML file to the web browser 134 to cause the web browser 134 to display the HTML file (step S430), whereupon the scan process is completed.

On the other hand, when receiving the environment information message (an "environment information message" branch in step S402), the image input management program 326 analyzes hardware information stored in the external memory 220, and extracts, e.g., information about network address of the information processing apparatus 101 on the local network 104 and information about network address and apparatus type of the image input apparatus 102 (step S403).

Next, the image input management program 326 searches for a search script (hereinafter denoted by reference numeral 325) suitable for the image input apparatus identified by the analysis of hardware information (step S404), and determines whether the search is succeeded (step S405). If the search is succeeded (i.e., if YES to step S405), an apparatus check message is sent from the server apparatus 103 to the information processing apparatus 101 in an attempt to try to determine whether the search script 325 can actually be used (step S406).

The image input management program 326 performs polling for a predetermined time period to confirm whether a check result message is received from the information processing apparatus 101 (step S407). When a check result message is received (i.e., if YES to step S407), the process proceeds to step S420. On the other hand, no check result message is received (i.e., if NO to step S407), the image input management program 326 determines that the search script 325 cannot be used, and the process proceeds to step S408. When a search request message is received in step S402 (a "search request message" branch in step S402) or when the search of search script has failed in step S405 (if NO to step S405), the process proceeds to step S408.

In step S408, the search program 324 transmits a search message to the information processing apparatus 101, and performs reception polling for receiving a response for a predetermined period of time.

Next, the search program 324 confirms whether it receives from the information processing apparatus 101 a search result (response) in reply to the search message (step S409). When receiving no search result (i.e., if NO to step S409), the process proceeds to step S430. On the other hand, when receiving a search result (i.e., if YES to step S409), the image input management program 326 is started. The image input management program 326 creates and transmits to the web browser 134 an HTML file for image input apparatus selection screen to cause the web browser 134 to display the image input apparatus selection screen. Then, the image input management program 326 performs reception polling for receiving a response for a predetermined period of time (step S410).

Next, the image input management program 326 confirms whether it receives from the information processing apparatus 101 an apparatus selection message, which is a response to the HTML file for image input apparatus selection screen (step S411). When receiving no apparatus selection message (i.e., if NO to step S411), the process proceeds to step S430.

On the other hand, when receiving an apparatus selection message (i.e., if YES to step S411), the image input management program 326 searches for a scan script (hereinafter denoted by reference numeral 328) suitable for the information processing apparatus identified by the apparatus selection message, and transmits the scan script 328 found by search to the web browser 134 of the image processing apparatus 101 (step S420).

Next, the image input management program 326 confirms whether it receives a scan setting message from the information processing apparatus 101 (step S421). When receiving no scan setting message before lapse of the predetermined timeout period (i.e., if NO to step S421), the process proceeds to step S430 described above.

On the other hand, when receiving a scan setting message before lapse of the predetermined timeout period (i.e., if YES to step S421), the scan job creation program 327 is started. The scan job creation program 327 creates a scan job according to the scan setting message and transmits it to the web browser 134 of the information processing apparatus 101 (step S422).

Next, the image reception program 329 is started in the server apparatus 103. The image reception program 329 confirms whether it receives scan image data from the information processing apparatus 101 (step S423). When receiving no scan image data before lapse of the predetermined timeout period (i.e., if NO to step S423), the image reception program 329 creates an HTML file for representing a scan setting error that includes a message that a scan process environment cannot be created. Then, the image reception program 329 causes the web browser 134 to display the created HTML file for representing a scan setting error, while utilizing that the scan script 328 periodically transmits to the server apparatus 103 a message related to HTML file update in order to periodically confirm the status of the server apparatus 103 (step S431), whereupon the scan process is completed.

When receiving scan image data (i.e., if YES to step S423), the image reception program 329 creates a final scan image from the scan image data, creates an HTML file including a reduced image that can be displayed on the information processing apparatus 101, and transmits the created HTML file to the information processing apparatus 101 (step S424). As a result, a screen for notifying the user of the completion of the scanning operation and for notifying the user of the final image data is displayed by the web browser 134, whereupon the scan process is completed.

Figure 7:
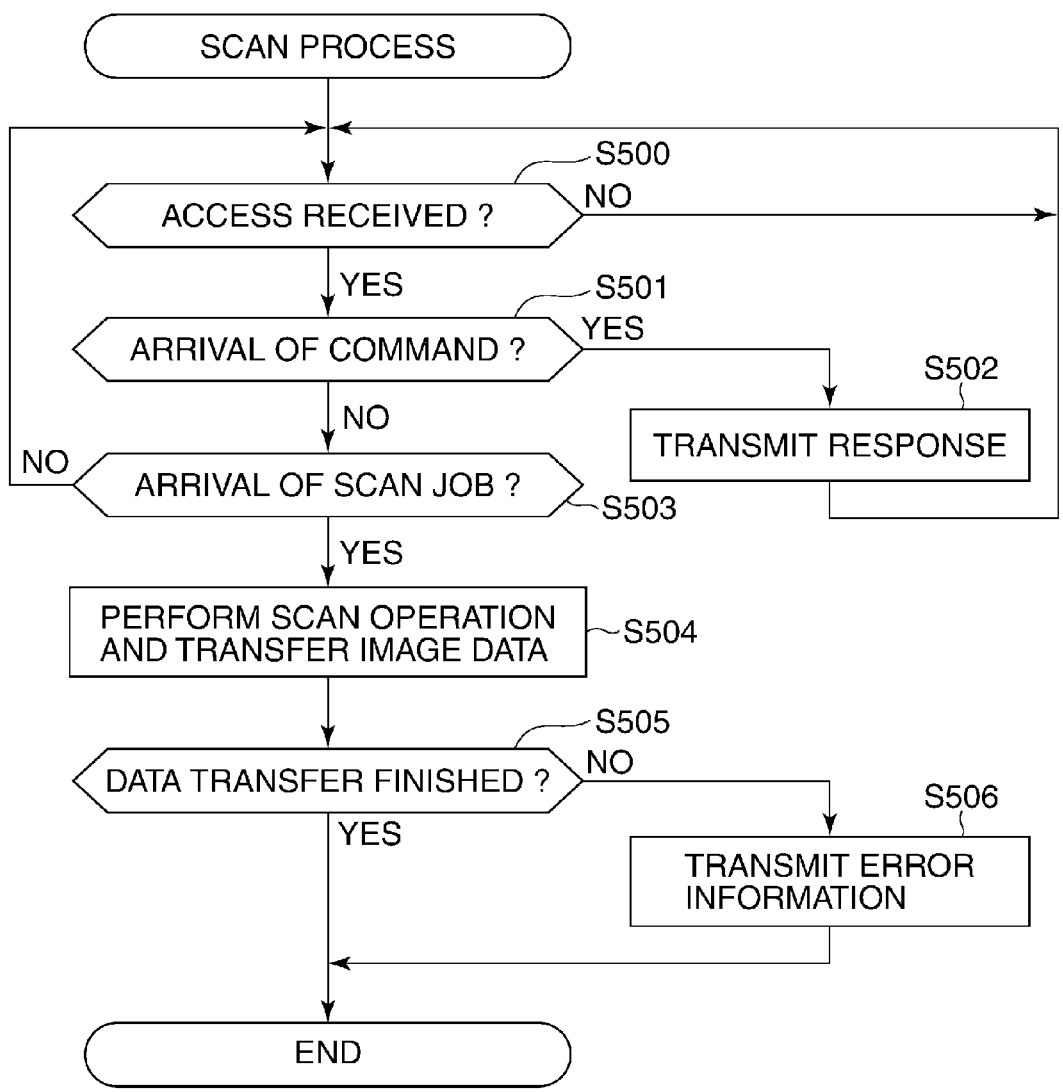
FIG. 7 is a flowchart showing an example of a scan process performed by the image input apparatus.

FIG. 7 shows, in flowchart, an example of a scan process performed by the image input apparatus 102.

As previously described, an image scanned by the image input apparatus 102 is embedded with additional information (code information), which is obtained by encoding, e.g., network address information into a bar code, and bar code information displayed on the operation unit 207 of the image input apparatus 102 or the bar code affixed to the image input apparatus 102 can be photographed by using the information processing apparatus 101.

At start of the scan process of FIG. 7, the CPU 202 of the image input apparatus 102 confirms whether access to the network I/F 205 is made via the local network 104 (step S500). If no access is made (i.e., if NO to step S500), the process returns to step S500 where the CPU 202 waits until access is made.

On the other hand, if the network I/F 205 is accessed (i.e., if YES to step S500), the CPU 202 determines whether a search command (apparatus check command) arrives or not (step S501). If a search command arrives (i.e., if YES to step S501), the CPU 202 acquires network address information of the information processing apparatus 101 by referring to the hardware information 221 stored in the external memory 220, and transmits a response to the information processing apparatus 101 (step S502), whereupon the process returns to step S500.

If no search command arrives (i.e., if YES to step S501), the CPU 202 determines whether a scan job message arrives from the information processing apparatus 101 (step S503). If no scan job message arrives (i.e., if NO to step S503), the process returns to step S500. On the other hand, if a scan job message arrives (i.e., if YES to step S503), the CPU 202 controls the scan unit 211 to perform a scan operation, and transfers the resultant image data to the information processing apparatus 101 (step S504).

Next, the CPU 202 confirms whether it receives from the information processing apparatus 101 a completion command that represents completion of transfer of image data (step S505). When receiving no completion command before lapse of the predetermined timeout period (i.e., if NO to step S505), the CPU 202 transmits error information to the information processing apparatus 101 (step S506), and completes the scan process. When receiving a completion command (i.e., if YES to step S505), the CPU 202 completes the scan process.

Figure 8:
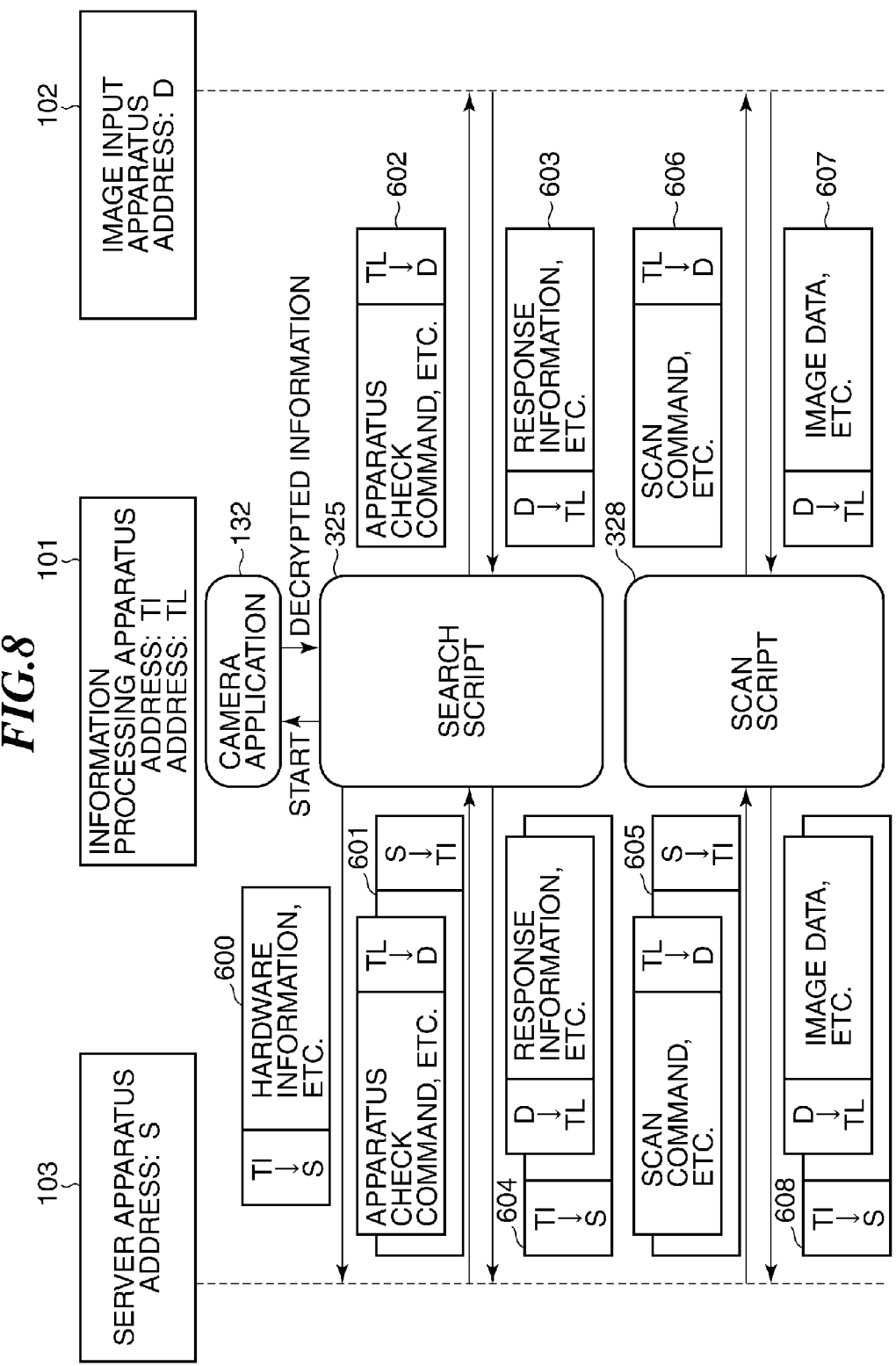
FIG. 8 is a view showing an example processing performed by scripts that operate on the information processing apparatus.

FIG. 8 shows an example of processing performed by the search script 325 and the scan script 328 that operate on the information processing apparatus 101.

In the following description, a network address at which the server apparatus 103 is connected at the network I/F 307 to the Internet 107 will be referred to as the network address "S", a network address at which the information processing apparatus 101 is connected at the first communication I/F 114 with the Internet 107 will be referred to as the network address "TI", a network address at which the information processing apparatus 101 is connected at the second communication I/F 102 to the local network 104 will be referred to as the network address "TL", and a network address at which the image input apparatus 102 is connected at the network I/F 205 to the local network 104 will be referred to as the network address "D".

In FIG. 8, a block 600 represents an example of packet data transmitted as the environment information message from the search script 325 operating on the web browser 134 to the server apparatus 103 in step S207 of the scan process shown in FIG. 4. As previously described, the environment information message includes, for example, character information and information representing the network address of the information processing apparatus 101 on the local network 104. In other words, the environment information message is packet data having a payload that includes, for example, hardware information of the image input apparatus 102 and information representing network addresses of the information processing apparatus 101 and the image input apparatus 102 on the local network 104.

The search script 325 creates the environment information message (packet data 600) in the form that can be transmitted through the data communication network 106 via the Internet 107.

A block 601 represents an example of packet data transmitted as the application check message from the server apparatus 103 to the search script 325 running on the web browser 134 in step S209 of FIG. 4.

The server apparatus 103 creates a packet (corresponding to a packet data part 602 described below) having a payload that includes, for example, the apparatus check command and having a header used for transmission via the local network 104. Then, the server apparatus 103 creates packet data 601 that includes the just-mentioned packet and a header used for transmission from the network address "S" to the network address "TI". The search script 325 that has received the packet data 601 extracts the packet data part 602 from the packet data 601 and transfers the packet data part 602 to the local network 104. At that time, as the transmission destination of the packet data part 602, the network address "D" of the image input apparatus 102 is specified.

By the above-described packet data extraction processing by the search script 325, the transmission of the apparatus check command described in step S210 of FIG. 4 is performed.

A block 603 represents an example of packet data (response) sent back from the image input apparatus 102 in reply to the apparatus check command. The packet data 603 has a header used for transmission from the address "D" of the image input apparatus 102 to the address "TL" of the information processing apparatus 101 on the local network 104 and has a payload including, e.g., response information. The search script 325 that has received the packet data 603 creates packet data 604 that includes the packet data 603. The search script 325 specifies the network address "TI" as the transmission source address of the packet data 604, and transfers the packet data 604 to the server apparatus 103 via the Internet 107.

Based on the packet data 603 included in the packet data 604 transmitted from the search script 325, the server apparatus 103 is capable of acquiring the network address "TL" of the information processing apparatus 101 on the local network 104 and the network address "D" of the image input apparatus 102 that has responded to the search.

A block 605 represents an example of the scan job message described in step S226 of FIG. 4. The scan job message 605 has the same packet data structure as that of the apparatus check message 601. The server apparatus 103 creates packet data that has a payload including, e.g., a scan command and has a header used for transmission via the local network 104. The server apparatus 103 creates packet data 605 that includes the just-mentioned packet data and that has a header used for transmission from the network address "S" to the network address "TI" of the information processing apparatus 101.

The scan script 328 that has received the packet data 605 extracts packet data part 606 from the packet data 605 and transfers the packet data part 606 to the local network 104.

In this manner, the scan script 328 is capable of easily creating the data to be transmitted to the local network 104 by only extracting the packet data part 606 from the packet data 605 created by the server apparatus 103.

A block 607 represents an example of packet data used for transmission of image data obtained by the image input apparatus 102 by performing a scan operation in response to the scan command. The packet data 607 has a header used for transmission from the address "D" of the image input apparatus 102 to the address "TL" of the information processing apparatus 101 on the local network 104, and has a payload including, e.g., image data.

The scan script 328 that has received the packet data 607 creates packet data including the packet data 607 and a header used for transmission from the network address "TI" to the network address "S", and transmits the packet data 608 to the Internet 107. The packet data 608 is transferred to the server apparatus 103 via the Internet 107.

It should be noted that the image data is divided into multiple pieces according to the contents of the scan command, and pieces of packet data 607 respectively corresponding to the divided pieces of image data are sequentially created. Thus, the scan script 328 sequentially processes these pieces of packet data 607 to thereby generate pieces of packet data 608, and sequentially transmits them to the server apparatus 103. It is therefore possible to transmit the image data from the image input apparatus 102 to the server apparatus 103 via the image processing apparatus 101, even if the RAM 112 used by the scan script 328 is small in capacity.

It should be noted that in a case where network port control must be made in the network communication, a statement of network port switching is included in the header of packet data in addition to the transmission source network address and the transmission destination network address, so that each of the search script 325 and the scan script 328 is capable of creating packet data having a port control function.

In this embodiment, the scan script 328 displays the scan setting screen on the display unit 122 of the information processing apparatus 101, creates the setting message based on information set by the user on the scan setting screen, and transmits the created setting message to the server apparatus 103. Further, each of the search script 325 and the scan script 328 periodically transmits a message related to HTML file update to the server apparatus 103 in order to periodically confirm the status of the server apparatus 103. In response to the message related to HTML file update, the server apparatus 103 transmits to the information processing apparatus 101 a notification message that notifies, e.g., error processing performed in the server apparatus 103. The search script 325 and the scan script 328 are able to operate according to the notification message.

Second Embodiment

Next, a description will be given of an image input system according to a second embodiment of this invention.

FIG. 9 shows in sequence diagram a scan process performed by the image input system of the second embodiment. It should be noted that the image input system of this embodiment has the same construction as that of the image input system of the first embodiment described with reference to FIGS. 1 to 3.

In this embodiment, the operation unit 207 of the image input apparatus 102 is provided with a bar code scan button for giving an instruction to perform bar code scanning. The image input apparatus 102 is configured to perform an adjustment such as turning off the backlight of the scan unit 211 in response to the bar code scan button being pressed, and then to scan a bar code image displayed on the display unit 122 of the information processing apparatus 101. By the bar code application 222 stored in the external memory 220 of the image input apparatus 102, additional information obtained by encoding address information is embedded into an image. When the image embedded with the additional information is read, the additional information is decrypted, whereby the address information is acquired.

In the scan process of FIG. 9, the web browser 134 is started in the information processing apparatus 101 (step S700). The web browser 134 accesses and logs in the URL of the server apparatus 103 in order to utilize a scan service (step S701).

If the log-in is succeeded, the web browser 134 downloads the search script 325 from the server apparatus 103 (step S702), and executes the search script 325 (step S703). The search script 325 acquires information representing the network address of the information processing apparatus 101 on the local network 104 (step S703), and transmits to the server apparatus 103 an address information message that represents the network address information (step S704).

In the server apparatus 103, the bar code program 330 executes bar code creation processing, in which the information representing the network address of the information processing apparatus 101 on the local network 104 is acquired from the address information message, and the acquired network address information is encoded to thereby create a bar code (additional information) (step S705).

Next, the bar code program 330 updates an HTML file such that the created bar code is included in the HTML file, and transmits to the information processing apparatus 101 the updated HTML file as a response to the address information message. Based on the updated HTML file, which is an image embedded with the bar code (additional information), the bar code is displayed on the display unit 122 of the information processing apparatus 101 (step S707), thereby instructing the user to set the display unit 122 on the image input apparatus 102. The user sets the display unit 122 (e.g., a display unit of a cellular phone) on an original table of the image input apparatus 102 (step S708).

Next, the image input apparatus 102 operates in a bar code scan mode to scan the bar code displayed on the display unit 122 (step S709). In the image input apparatus 102, the bar code application 222 recognizes a scan image of the bar code and extracts character information from the scan image (step S710). The bar code application 222 transmits hardware information 221 to a transmission destination network address (the network address of the information processing apparatus 101 in this example) represented by the character information (step S711).

The search script 325 operating on the information processing apparatus 101 receives the hardware information 221 and transmits to the server apparatus 103 a hardware information message corresponding to the hardware information 221 (step S712). In the server apparatus 103, the image input apparatus management program 326 analyzes the received hardware information message (step S713), and the search program 324 transmits to the information processing apparatus 101 an apparatus check message in an attempt to try to determine whether a search script can be used that is obtained based on a result of the analysis of the hardware information message (step S714).

When receiving the apparatus check message, the search script 325 in the information processing apparatus 101 transmits to the image input apparatus 102 an apparatus check command corresponding to the apparatus check message by using a transfer method such as IP header conversion processing (step S715).

When receiving the apparatus check command, the CPU 202 of the image input apparatus 102 determines whether the image input apparatus 102 is an apparatus corresponding to the search script associated with the apparatus check command (step S716). If the image input apparatus 102 is an apparatus corresponding to the search script associated with the apparatus check command, the CPU 202 transmits a response to the information processing apparatus 101 from which the apparatus check command has been transmitted (step S717).

When receiving the response, the search script 325 that operates on the web browser 134 running on the information processing apparatus 101 converts the response into a check result message and transfers the check result message to the server apparatus 103 (step S718).

Next, the image input apparatus management program 326 selects a scan script suitable for the image input apparatus 102 corresponding to the check result message. Then, the scan script is downloaded from the server apparatus 103 to the web browser 134 (step S720).

Subsequently, the same processing as that executed in the scan processing of FIG. 4 is executed. More specifically, in steps S721 to S735, the same processing as that in steps S221 to S235 of FIG. 4 is executed. Thus, a description of steps S721 to S735 is omitted.

As described above, with the second embodiment, in a case where the image input apparatus 102 has a function of scanning a bar code, a bar code image can be acquired without using a camera function of the information processing apparatus 101, and the scan process can be carried out as in the first embodiment.

FIG. 10 show in flowchart an example of a scan process performed by the image input apparatus of the image input system according to the second embodiment.

At start of the scan process of FIG. 10, the CPU 202 of the image input apparatus 102 confirms whether the network I/F 205 is accessed via the local network 104 and confirms whether an input is given through the operation unit 207, thereby confirming whether an event occurs (step S800). If no event occurs (i.e., if NO to step S800), the process returns to step S800 where the CPU 202 waits until an event occurs.

If an event occurs (i.e., if YES to step S800), the CPU 202 determines whether the event corresponds to a press of the bar code scan button (step S801). If the event does not correspond to a press of the bar code scan button (i.e., if NO to step S801), the scan process is completed. On the other hand, the event corresponds to a press of the bar code scan button (i.e., if YES to step S801), the CPU 202 controls to turn off the backlight of the scan unit 211 and to scan the bar code displayed on the display unit 122 placed on the original table of the image input apparatus 102 (step S802).

Next, the bar code application 222 is started on the CPU 202, and a bar code image embedded with additional information (code information) is read by the bar code application 222. Then, the bar code application 222 decrypts the additional information to thereby acquire address information (step S803).

Next, it is determined whether or not the decryption of the additional information by the bar code application 222 is succeeded (step S804). If the decryption is succeeded (i.e., if YES to step S804), the CPU 202 transmits hardware information to the destination (the information processing apparatus 101) represented by address information obtained by the decryption (step S805), whereupon the scan process is completed.

If the decryption has failed (i.e., if NO to step S804), the CPU 202 determines whether a predetermined timeout period has lapsed (step S810). If the timeout period has not lapsed (i.e., if NO to step S810), the CPU 202 controls to adjust or calibrate the amount of backlight of the scan unit 211 (step S811), whereupon the process returns to step S802.

If the timeout period has lapsed (i.e., if YES to step S810), the CPU 202 controls the operation unit 207 to display a screen for inquiring whether bar code scanning should be retried, and then confirms whether an input requesting the retry of bar code scanning is given by the user via the operation unit 207 (step S812).

If the retry request is input (i.e., if YES to step S812), the CPU 202 causes the operation unit 207 to display a request prompting the user to again set the amount of backlight of the display unit 122 of the information processing apparatus 101. This is because since the amount of backlight of the display unit 122 often changes with lapse of time, the bar code scanning is retried in this embodiment after the amount of backlight of the display unit 122 is set again. When an input indicating that the amount of backlight has been set again is given by the user via the operation unit 207 (step S813), the process returns to step S801.

If an input indicating that the retry of bar code scanning is unnecessary is given by the user or if the retry request is not input before lapse of a predetermined period of time (i.e., if NO to step S812), the CPU 202 causes the operation unit 207 to provide an error display including, e.g., a statement that acquisition of information has failed (step S820), whereupon the scan process is completed.

In the above-described first and second embodiments, instead of a bar code or a two-dimensional bar code, an identifier such as a RFID (radio frequency identification) used in wireless communication can be used to exchange address information between the information processing apparatus 101 and the image input apparatus 102. It is efficient that the server apparatus 103 configured to be adapted to plural types of identifiers selectively uses an identifier that is suitable for both the information processing apparatus 101 and the image input apparatus 102.

It is also possible to use a bi-directional communication technique such as Web Sockets (http://dev.3.org/html5/WebSockets) for the communication in the image input system according to each of the embodiments in order to carry out an efficient bi-directional communication with ease. In that case, it is unnecessary for the script to periodically transmit to the server apparatus 103 a message related to HTML file update in order to periodically confirm the status of the server apparatus 103, and a message from the server apparatus 103 can be updated without the need of a request from the information processing apparatus 101.

In the above-described embodiments, a protocol defined by WS-Eventing is used for, e.g., image data transmission. Alternatively, GENA (general event notification architecture) or the like can be used. In this invention, the protocol is not limited, but may be any protocol that has a function of properly conveying hardware information to the search script 325 that operates on the information processing apparatus 101.

In the embodiments, a scan job generated in the server apparatus 103 is transmitted to the image input apparatus 102 through the information processing apparatus 101. However, it is possible to transmit general purpose information such as a scan job ticket to the image input apparatus 102.

According to the above-described embodiments, even in the case of using the information processing apparatus 101 such as a cellular phone that has a satisfactory communication performance but is low in memory and screen performance, the web browser 134 operating on the information processing apparatus 101 can search for an optimum image input apparatus 102, while utilizing an information storage function of the server apparatus 103 on the Internet, and an optimum image input system can be configured.

Furthermore, the user is capable of utilizing a scan function of the image input apparatus 102 by only operating the web browser 134, even if the user uses the image input apparatus 102 for the first time, without being forced to perform operations such as environment settings for the information processing apparatus 101 or for the local network 104.

The image input systems according to the above-described embodiments do not require the provision of a scan server on a subnet of the network, and are thus simple in construction. Furthermore, the information processing apparatus 101 does not require a large-capacity storage for storing image data, and image data can be provided for cloud services.

As apparent from the foregoing description, the CPU 111 of the information processing apparatus 101 functions as first to third transfer units of this invention, which are defined in the appended claims.

The CPU 301 of the server apparatus 103 cooperates with the scan process related programs 323 to function as first and second transmission units, job transmission unit, and reception unit of this invention.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-123638, filed Jun. 1, 2011, which is hereby incorporated by reference herein in its entirety.

What is claimed is:

1. An information processing apparatus capable of communicating with an image input apparatus and with a server apparatus, comprising:
    a receiving unit configured to send a request to the server apparatus to receive a search script from the server apparatus;
    a first executing unit configured to execute the received search script;
    a transmission unit configured to obtain an apparatus type of the image input apparatus and transmit the apparatus type to the server apparatus, in accordance with an instruction from the executed search script;
    a first transfer unit configured to transfer, when receiving an apparatus check message from the server apparatus for determining whether a script corresponding to the apparatus type can be used by the image input apparatus, the apparatus check message to the image input apparatus in accordance with an instruction from the executed search script;
    a second transfer unit configured to, when receiving a response that a script corresponding to the apparatus type can be used by the image input apparatus, as a response to the transferred apparatus check message, from the image input apparatus, transfer the response to the server apparatus in accordance with an instruction from the executed search script;
    a second executing unit configured to receive from the server apparatus a scan script suited for the image input apparatus to execute the received scan script, the scan script being searched from at least one of scan scripts transmittable from the server apparatus; and
    a display unit configured to display a setting screen for the image input apparatus in accordance with an instruction from the executed scan script.

2. The information processing apparatus according to claim 1, wherein said transmission unit executes, in accordance with instructions from the executed search script:

starting a camera application stored in the information processing apparatus;

notifying a user to use the camera application to photograph bar code information provided in the image input apparatus; and extracting the apparatus type from the photographed bar code information when the bar code information is photographed in accordance with the notification.

3. The information processing apparatus according to claim 1, wherein the information processing apparatus is a portable information processing apparatus and is connected to the image input apparatus via a wireless circuit, which is a local network, and said transmission unit executes, in accordance with instructions from the executed search script:

acquiring address information representing an address of the information processing apparatus on the local network, and transmitting the address information to the server apparatus to acquire from the server apparatus an image embedded with code information created by the server apparatus in accordance with the address information, and notifying, when the image embedded with the code information has been displayed on a display unit of the information processing apparatus, a user to scan the image displayed on the display unit by the image input apparatus, and transmitting to the server apparatus the apparatus type, when the image is scanned in accordance with the notification, the address is extracted from the scanned image by the image input apparatus, and the apparatus type is transmitted to the extracted address as a destination by the image input apparatus.

4. The information processing apparatus according to claim 1, wherein the server apparatus transmits a completion message to the information processing apparatus after performing storage processing on the image data.

5. A server apparatus capable of communicating with an information processing apparatus that is capable of communicating with an image input apparatus, comprising:

a storage unit configured to store a search script and at least one of scan scripts;

a first transmission unit configured to transmit to the information processing apparatus the search script in response to a request from the information processing apparatus;

a second transmission unit configured, when an apparatus type of the image input apparatus is sent from the information processing apparatus, to transmit to the information processing apparatus an apparatus check message for determining whether a script corresponding to the apparatus type can be used by the image input apparatus;

a searching unit configured to search a scan script suit for the image input apparatus from the at least one of the scan scripts when receiving a response that a script corresponding to the apparatus type can be used by the image input apparatus as a response to the apparatus check message from the image input apparatus via the image information apparatus; and a third transmission unit configured to transmit the searched scan script to the information processing apparatus.

6. A control method for an information processing apparatus capable of communicating with an image input apparatus and with a server apparatus, comprising:

a step of sending a request to the server apparatus to receive a search script from the server apparatus;

executing the received search script;

obtaining an apparatus type of the image input apparatus and transmitting the apparatus type to the server apparatus, in accordance with an instruction from the executed search script;

transferring, when receiving an apparatus check message from the server apparatus for determining whether a script corresponding to the apparatus type can be used by the image input apparatus, the apparatus check message to the image input apparatus in accordance with an instruction from the executed search script;

when receiving a response that a script corresponding to the apparatus type can be used by the image input apparatus, as a response to the transferred apparatus check message, from the image input apparatus, transferring the response to the server apparatus in accordance with an instruction from the executed search script;

receiving from the server apparatus a scan script suited for the image input apparatus to execute the received scan script, the scan script being searched from at least one of scan scripts transmittable from the server apparatus; and displaying a setting screen for the image input apparatus in accordance with an instruction from the executed scan script.

7. A control method for a server apparatus capable of communicating with an information processing apparatus that is capable of communicating with an image input apparatus, comprising:

a storing step of storing a search script and at least one of scan scripts;

a first transmission step of transmitting to the information processing apparatus the search script in response to a request from the information processing apparatus;

a second transmission step, when an apparatus type of the image input apparatus is sent from the information processing apparatus, of transmitting to the information processing apparatus an apparatus check message for determining whether a script corresponding to the apparatus type can be used by the image input apparatus;

a searching step of searching a scan script suit for the image input apparatus from the at least one of the scan scripts when receiving a response that a script corresponding to the apparatus type can be used by the image input apparatus as a response to the apparatus check message from the image input apparatus via the image information apparatus; and a third transmission step configured to transmit the searched scan script to the information processing apparatus.

8. A non-transitory computer-readable storage medium storing a program for causing a computer to execute the control method as set forth in claim 6.

9. A non-transitory computer-readable storage medium storing a program for causing a computer to execute the control method as set forth in claim 7.

10. The information processing apparatus according to claim 1, further comprising:

a third transfer unit configured to transmit to the server apparatus a setting message that represents settings which have been set on the setting screen and according to which an original will be scanned by the image input apparatus, and supply the image input apparatus with a job command that corresponds to a job message transmitted from the server apparatus in reply to the setting message, in accordance with an instruction from the executed scan script; and a fourth transfer unit configured to receive image data that is obtained by scanning performed by the image input apparatus in accordance with the job command and transfer the received image data to the server apparatus.

11. The server apparatus according to claim 5, further comprising:

a job transmission unit configured, in a case where the scan script is executed in the information processing apparatus to display a setting screen by the information processing apparatus and a setting message that represents settings which have been set on the setting screen and according to which an original will be scanned by the image input apparatus is sent from the information processing apparatus, to supply a job message corresponding to the setting message to the information processing apparatus; and a reception unit configured, in a case where image data is obtained by scanning that is executed by the image input apparatus in accordance with a job command supplied to the image input apparatus from the information processing apparatus in reply to the job message, to receive via the information processing apparatus the image data obtained by the scanning.

* * * * *